Jan. 20, 1942.　　　G. A. PETROE　　　2,270,785
CHLORINATION SYSTEM
Filed July 27, 1939
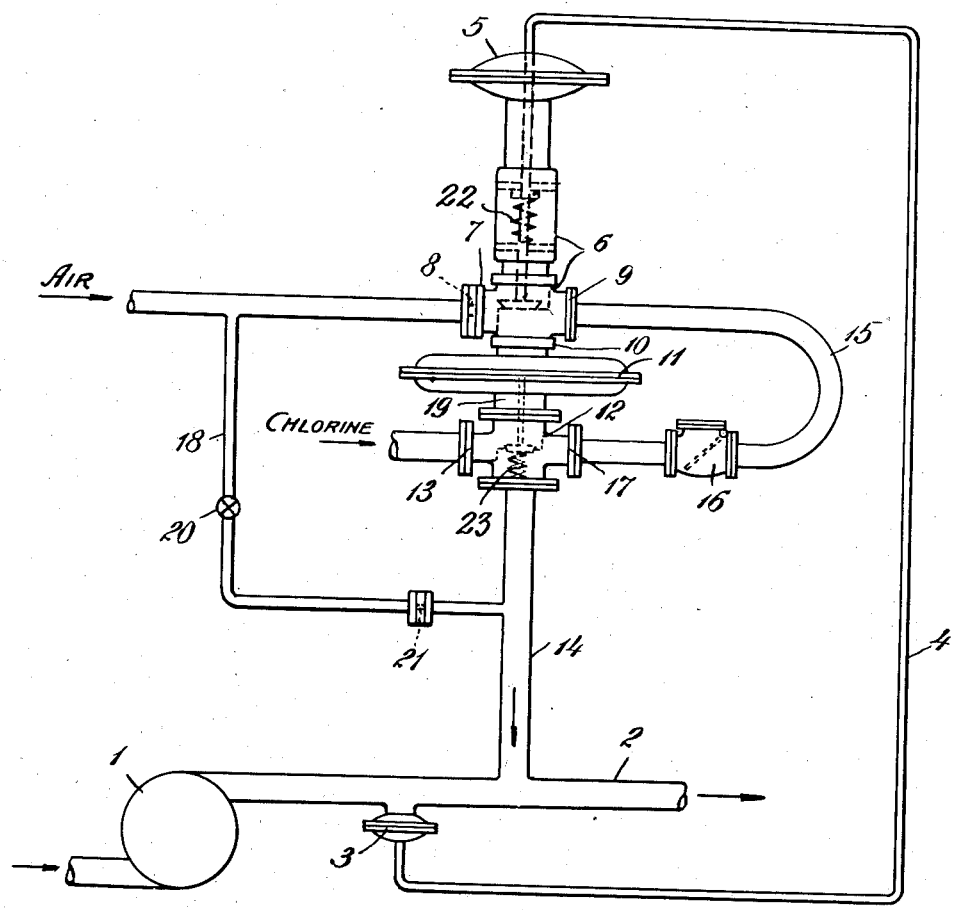
INVENTOR
Gregory A. Petroe
BY
ATTORNEYS Patented Jan. 20, 1942

2,270,785

UNITED STATES PATENT OFFICE 2,270,785

CHLORINATION SYSTEM

Gregory A. Petroe, Niagara Falls, N. Y., assignor to The Mathieson Alkali Works, Inc., New York, N. Y., a corporation of Virginia Application July 27, 1939, Serial No. 286,946

8 Claims. (Cl. 137—78)

This invention relates to a pneumatic check system for controlling the admission of chlorine to chlorination systems.

In chlorination systems in which aqueous solutions, slurries and suspensions are subjected to the action of chlorine in a vat or the like, it is conventional practice to introduce the chlorine into the aqueous medium before it is discharged into the vat. For example, in the bleaching of paper pulp, chlorine is generally introduced into the delivery line through which the pulp suspension is forced under pressure into the treating vat. If the pressure in this line falls, due either to mechanical failure of the pump which supplies the pulp suspension to the vat or to failure of the supply of the suspension to the pump to be delivered to the vat or for any other reason, a serious hazard is created by the chlorine which then discharges into the atmosphere through the delivery line. This hazard is real even though the chlorine supply be shut off manually as soon as possible after the pressure drop in the delivery line is detected. Chlorine in the connections between the chlorine shut-off valve and the delivery line inevitably escapes to the atmosphere with concomitant danger to workmen in the vicinity. Furthermore, if any moisture, say from the atmosphere, is allowed to enter the chlorine line before chlorine has been evacuated therefrom, the acids thus formed have a serious corrosive effect on the connections with which they come in contact.

I have devised a novel checking system for controlling the admission of chlorine to the pressure delivery line of such chlorination systems which is immediately responsive to any drop in the pressure within the delivery line. My novel system further includes means for automatically purging the chlorine connections with dry air so as to eliminate chlorine remaining therein upon shut-off of the chlorine supply and for preventing the entrance of moisture into the chlorine line.

My novel check system for controlling the admission of chlorine to the pressure delivery line of such chlorination systems comprises means for introducing dry air into the chlorine line when the pressure within the delivery line drops to a predetermined value, and means for terminating the admission of chlorine to the delivery line upon the pressure within the delivery line dropping to said predetermined value, the means for terminating admission of chlorine to the delivery line being responsive directly to the introduction of the dry air into the chlorine line.

More specifically, my novel check system comprises a spring valve connected with a source of dry compressed air and adapted to be held in open position by the spring, means for holding the valve in closed position by pressure within the delivery line exceeding a predetermined minimum, means for introducing air discharged from the valve into the chlorine line, a second spring valve adapted to be held in open position by the spring connected to permit admission of chlorine to the chlorine line, and means for closing this second spring valve, the chlorine shut-off valve, by the pressure of the air discharged from the first spring valve, the air valve. The check system of my invention operates to control the admission of chlorine to the pressure delivery line of the chlorination system by introducing dry air into and thus purging the chlorine line upon a drop in pressure within the delivery line and by utilizing the pressure of the air thus discharged into the chlorine line to terminate the admission of chlorine to the delivery line through the chlorine line.

My invention will be more fully understood by reference to the accompanying drawing which diagrammatically represents, in elevation, a check system embodying my invention connected with a pump line for delivering a pulp suspension and introduced chlorine to a vat, for example.

The check system illustrated comprises a pump 1 adapted to force the pulp suspension through delivery line 2 into a vat. A diaphragm mechanism 3, responsive to the pressure in delivery line 2, is connected hydraulically through line 4 with diaphragm mechanism 5. Thus, pressure on the diaphragm 3 causes a similar deflection of the diaphragm 5. Diaphragm 5 is connected with a conventional spring valve 6 designed to be held in open position by the spring 22 so that a deflection of the diaphragm 5, responsive to normal pressure in delivery line 2, maintains valve 6 in closed position. Valve 6 is provided with an inlet end 7 in which a fixed orifice nozzle 8 is inserted. Valve 6 is further provided with a discharge outlet 9 and with an additional outlet 10 communicating with a diaphragm mechanism 11. Diaphragm 11 is connected pneumatically through line 19 with a second conventional spring valve 12 in such a manner that, when no pressure is exerted on the diaphragm 11, valve 12 is maintained in open position by the spring 23 so as to permit chlorine to flow through inlet 13 into chlorine line 14. The valve is shown in closed position, as when pressure is exerted on the diaphragm 11. The exhaust outlet 9 of valve 6 communicates through line 15 and a check valve 16 to a second inlet 17 in valve 12 so as to permit dry air discharged from valve 6 to flow through the check valve 16 and through valve 12 into the chlorine line 14. Line 18 is connected to the compressed air line which supplies air to valve 6 to provide for the direct introduction of dry air through control valve 20 and bleed valve 21 into line 14.

In the operation of my novel check system, the pressure imposed upon the diaphragm 3 by the pulp suspension flowing through delivery line 2 is imparted to diaphragm 5 to maintain valve 6 in closed position. Spring valve 12 is held open under these conditions by spring 23 and allows chlorine to flow through line 14 into line 2, together with such dry air as may be bled into the system through line 18. Whenever the pressure within delivery line 2 is substantially reduced, due either to mechanical failure of pump 1 or to a lack of pulp supply for this pump or for any other reason, the pressure is reduced on diaphragm 3 and, correspondingly, on diaphragm 5 thus allowing valve 6 to open by the action of the spring 22 so as to discharge dry compressed air through line 15 and valve 12 into chlorine line 14. The compressed air discharged through valve 6 creates a pressure on the diaphragm 11 equal to the air pressure within line 15 causing valve 12 to close, thereby terminating the admission of chlorine to line 14 and to delivery line 2. The flow of dry air through line 15 into line 14 sweeps chlorine from line 14 almost as soon as the pressure begins to fall in line 2 and in this way insures the absence of moisture in the chlorine line as well as the removal of chlorine from this line into the contents of the vat into which line 2 discharges before the chlorine has an opportunity to escape, through pump 1 for example, into the atmosphere. The pulp suspension remaining in the delivery line 2 on the pump side of line 14 serves as a temporary seal so that chlorine swept from the chlorine line is all driven into the contents of the vat. When normal operation is resumed the pressure on diaphragms 3 and 5 closes air valve 6 thereby releasing pressure on diaphragm member 11 so that valve 12 is opened by the spring 23. Check valve 16 prevents chlorine from backing through line 15 into valve 6.

It will be seen, therefore, that my novel check system provides control means automatically and substantially immediately responsive to any substantial drop in pressure in the delivery line of such chlorination systems. My novel check system prevents excessive loss of chlorine in the event of such a drop in pressure in the delivery line and further avoids serious hazards by preventing the escape of chlorine and by preventing the entrance of moisture while any chlorine remains in the several connections between the shut-off valve and the supply pump and vat.

I claim:

1. A check system for controlling the admission of chlorine under pressure through a chlorine line to a pressure delivery line of a chlorination system and against the pressure in the delivery line through which material to be chlorinated is delivered under pressure which comprises a spring valve connected with a source of dry compressed air and adapted to be spring held in open position, means for holding the valve in closed position by the pressure within the delivery line, whereby the air valve is opened upon a drop in pressure within the delivery line below a predetermined value, means for introducing dry air discharged from the valve into the chlorine line, and means responsive to the introduction of air into the chlorine line for terminating the admission of chlorine through the chlorine line to the delivery line.

2. A check system for controlling the admission of chlorine under pressure through a chlorine line to a pressure delivery line of a chlorination system and against the pressure in the delivery line through which material to be chlorinated is delivered under pressure which comprises a spring valve connected with a source of dry compressed air and adapted to be spring held in open position, means for holding the valve in closed position by the pressure within the delivery line, whereby the air valve is opened upon a drop in pressure within the delivery line below a predetermined value, means for introducing dry air discharged from the valve into the chlorine line, and a second spring valve adapted to be spring held in open position and responsive to the introduction of air into the chlorine line for terminating the admission of chlorine through the chlorine line to the delivery line.

3. A check system for controlling the admission of chlorine under pressure through a chlorine line to a pressure delivery line of a chlorination system and against the pressure in the delivery line through which material to be chlorinated is delivered under pressure which comprises a spring valve connected with a source of dry air and adapted to be spring held in open position, means for holding the valve in closed position by the pressure within the delivery line, whereby the air valve is opened upon a drop in pressure within the delivery line below a predetermined value, means for introducing air discharged from the valve into the chlorine line, a spring valve adapted to be spring held in open position to permit admission of chlorine through the chlorine line, and means for closing the chlorine valve responsive to the pressure of the air discharged from the air valve.

4. A check system for controlling the admission of chlorine under pressure through a chlorine line to a pressure delivery line of a chlorination system and against the pressure in the delivery line through which material to be chlorinated is delivered under pressure which comprises a diaphragm mechanism responsive to the pressure within the delivery line, a spring valve for controlling the introduction of dry compressed air into the chlorine line adapted to be spring held in open position and maintained in closed position by the pressure imposed upon the diaphragm mechanism, whereby the air valve is opened upon a drop in pressure within the delivery line below a predetermined value, means for introducing into the chlorine line air discharged from said valve, a second diaphragm mechanism responsive to the pressure of the air discharged into the chlorine line, and a second spring valve spring held in open position to permit admission of chlorine through the chlorine line and adapted to be closed by the pressure of said air on said second diaphragm mechanism.

5. The method of controlling the admission of chlorine under pressure through a chlorine line to a pressure delivery line of a chlorination system and against the pressure in the delivery line through which material to be chlorinated is delivered under pressure which comprises introducing dry air into the chlorine line when the pressure within the delivery line drops below a predetermined value, and utilizing the pressure of the air discharged into the chlorine line to terminate the admission of chlorine to the delivery line through the chlorine line.

6. A check system for controlling the admission of chlorine under pressure through a chlorine line into a pressure delivery line of a chlorination system and against the pressure in the delivery line through which material to be chlorinated is delivered under pressure which comprises means responsive to a drop in pressure in the delivery line to a predetermined value for introducing dry air into the chlorine line and means for initiating the termination of the admission of chlorine to the delivery line automatically simultaneously with the introduction of the air into the chlorine line.

7. A check system for controlling the admission of chlorine under pressure through a chlorine line to a pressure delivery line of a chlorination system and against the pressure in the delivery line through which material to be chlorinated is delivered under pressure which comprises means responsive to a drop in pressure in the delivery line to a predetermined value for introducing dry air into the chlorine line and means responsive to the introduction of said air into the chlorine line for terminating the admission of chlorine through the chlorine line to the delivery line.

8. A check system for controlling the admission of chlorine under pressure through a chlorine line to a pressure delivery line of a chlorination system and against the pressure in the delivery line through which material to be chlorinated is delivered under pressure which comprises a spring valve connected with a source of dry air and adapted to be spring held in open position, means for holding the valve in closed position by pressure within the delivery line above a predetermined value, means for introducing dry air discharged from the valve into the chlorine line when the pressure within the delivery line drops below said predetermined value, and means for initiating the termination of the admission of chlorine to the delivery line automatically simultaneously with the introduction of the air into the chlorine line.

GREGORY A. PETROE.